United States Patent
Arimilli et al.

(10) Patent No.: US 7,290,094 B2
(45) Date of Patent: Oct. 30, 2007

(54) PROCESSOR, DATA PROCESSING SYSTEM, AND METHOD FOR INITIALIZING A MEMORY BLOCK TO AN INITIALIZATION VALUE WITHOUT A CACHE FIRST OBTAINING A DATA VALID COPY

(75) Inventors: Ravi K. Arimilli, Austin, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 11/130,907

(22) Filed: May 17, 2005

(65) Prior Publication Data
US 2006/0265553 A1  Nov. 23, 2006

(51) Int. Cl.
*G06F 13/00* (2006.01)

(52) U.S. Cl. ................ 711/144; 711/145; 711/146; 711/119

(58) Field of Classification Search ........... 711/144, 711/145, 146, 119
See application file for complete search history.

(56) References Cited

U.S. PATENT DOCUMENTS

| | | | |
|---|---|---|---|
| 6,760,819 B2 * | 7/2004 | Dhong et al. | 711/146 |
| 2002/0129211 A1 * | 9/2002 | Arimilli et al. | 711/146 |
| 2005/0154832 A1 * | 7/2005 | Steely et al. | 711/133 |
| 2006/0179241 A1 * | 8/2006 | Clark et al. | 711/141 |
| 2006/0179252 A1 * | 8/2006 | Cantin et al. | 711/144 |

* cited by examiner

*Primary Examiner*—Hong Kim
(74) *Attorney, Agent, or Firm*—Casimer K. Salys; Dillon & Yudell LLP

(57) ABSTRACT

In response to receiving an initialization operation from an associated processor core that indicates a target memory block to be initialized, a cache memory determines a coherency state of the target memory block. In response to a determination that the target memory block has a data-invalid coherency state with respect to the cache memory, the cache memory issues on a interconnect a corresponding initialization request indicating the target memory block. In response to the initialization request, the target memory block is initialized within a memory of the data processing system to an initialization value. The target memory block may thus be initialized without the cache memory holding a valid copy of the target memory block.

18 Claims, 9 Drawing Sheets

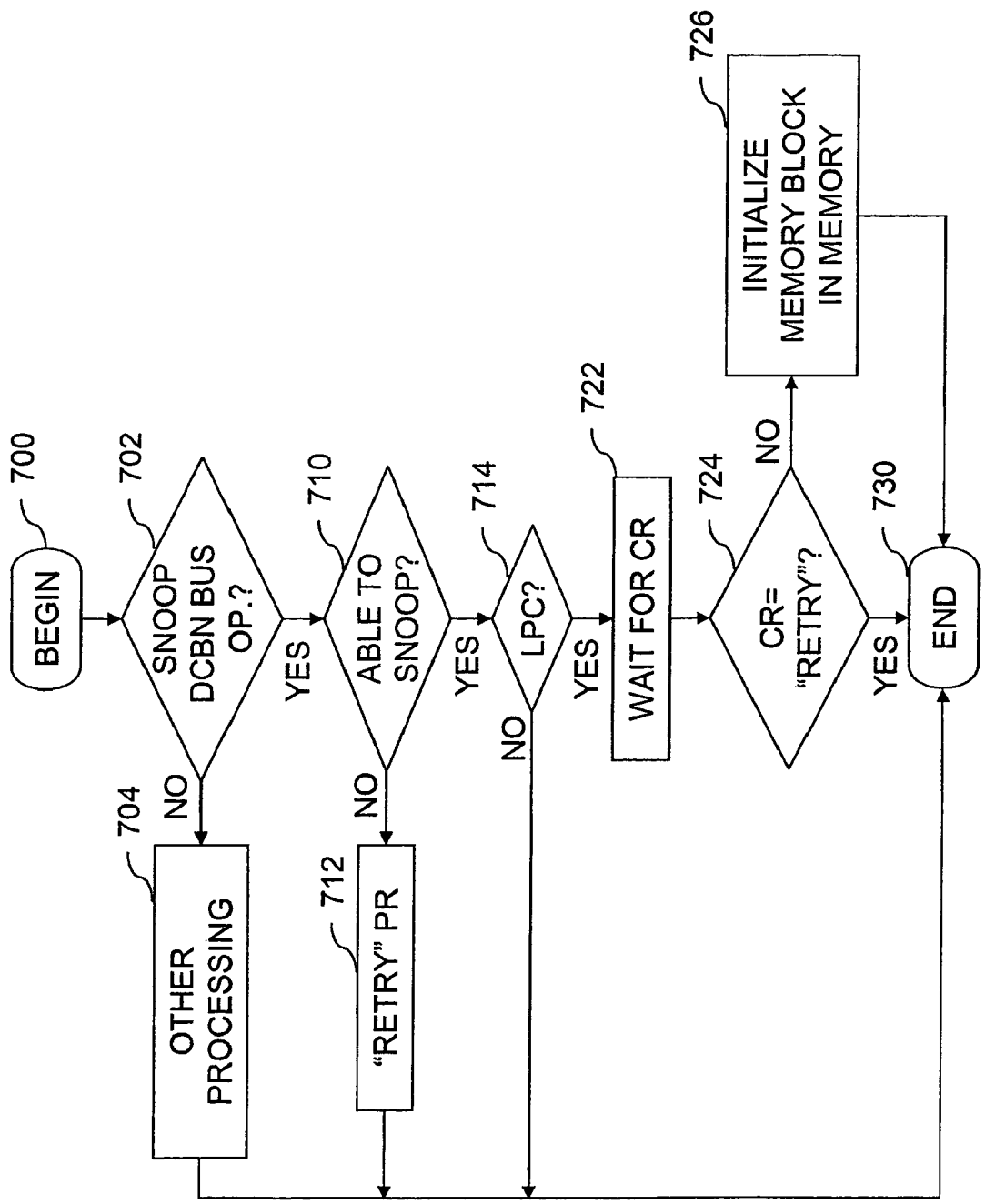

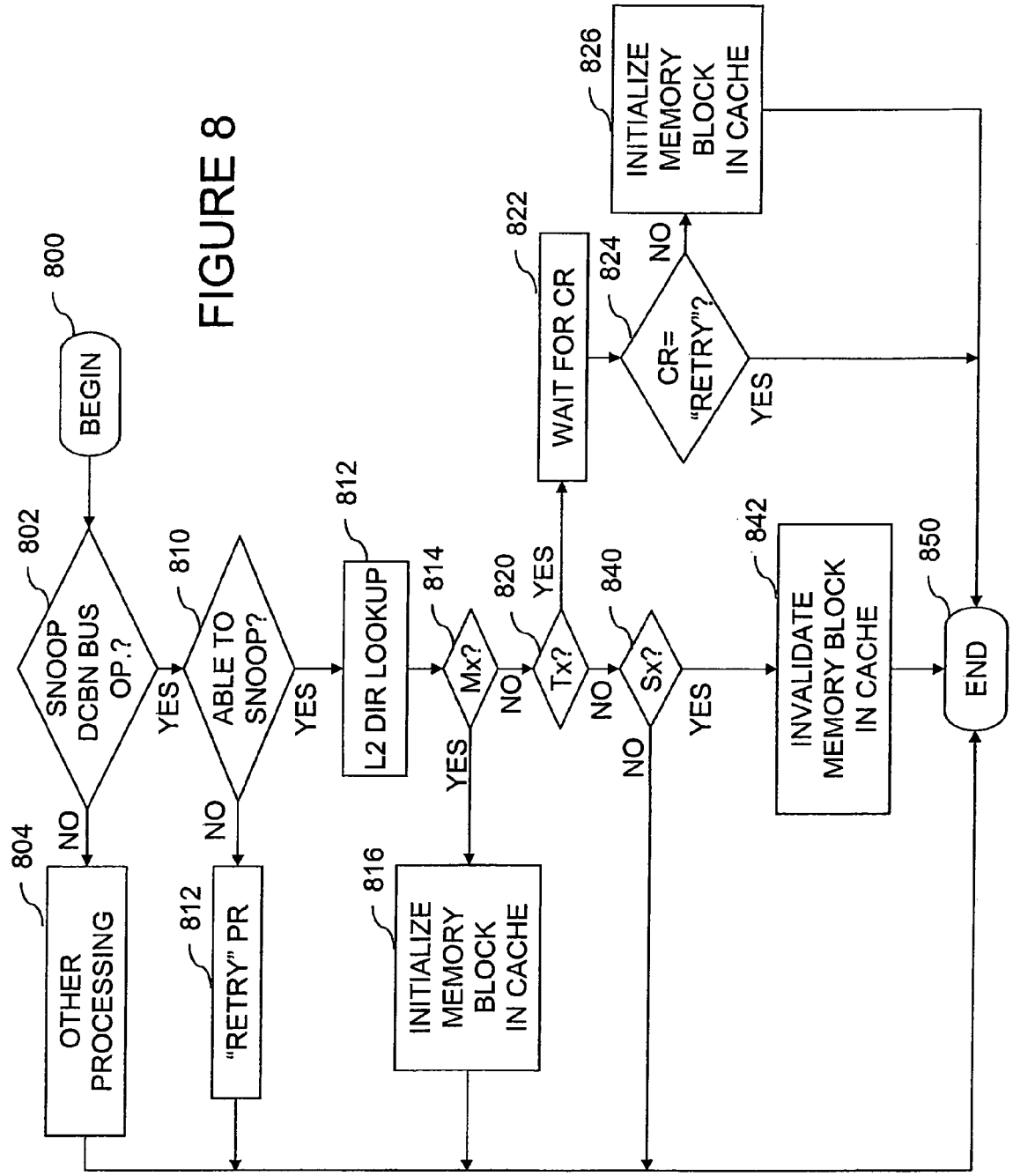

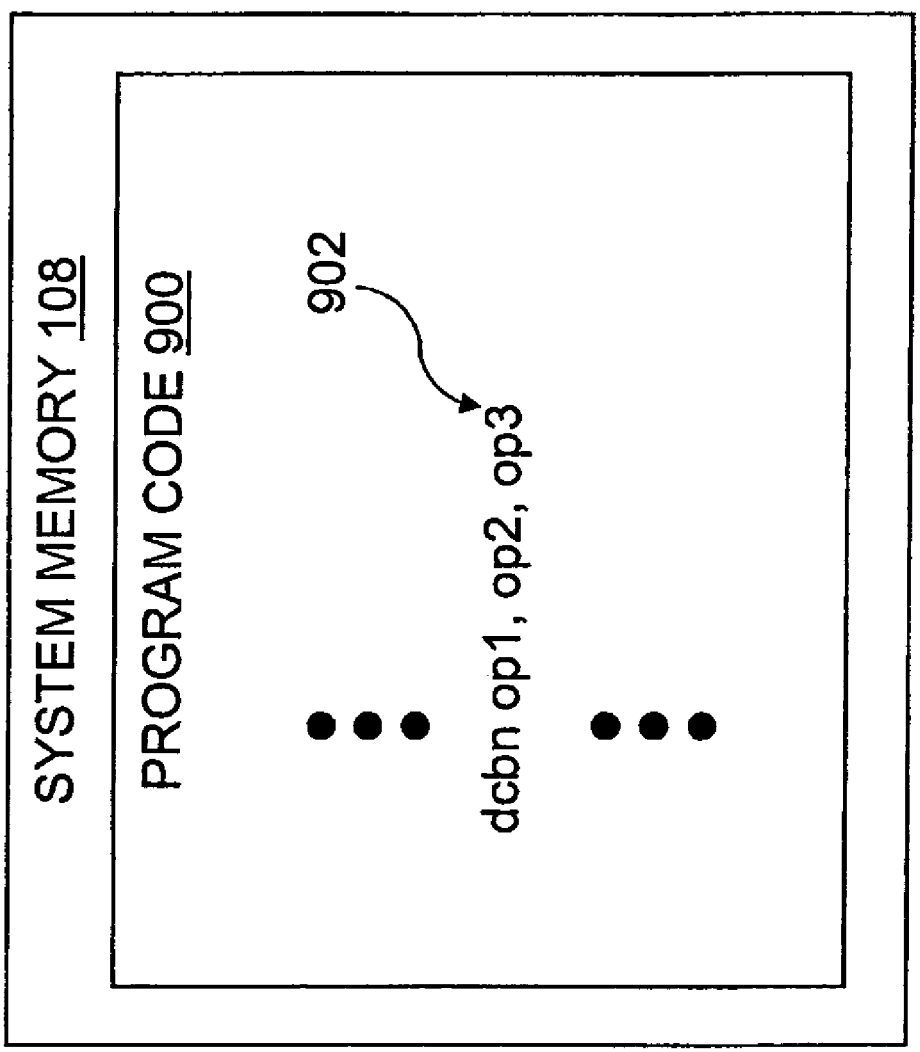

PROCESSOR, DATA PROCESSING SYSTEM, AND METHOD FOR INITIALIZING A MEMORY BLOCK TO AN INITIALIZATION VALUE WITHOUT A CACHE FIRST OBTAINING A DATA VALID COPY

CROSS-REFERENCE TO RELATED APPLICATION

The present invention is related to U.S. patent application Ser. No. 11/055,305, filed on Feb. 10, 2005, currently pending, which is incorporated herein by reference in its entirety.

BACKGROUND OF THE INVENTION

1. Technical Field

The present invention relates in general to data processing and, in particular, to initializing memory blocks in a data processing system.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of coherency states stored in association with the cache lines of each cache hierarchy, as well as a set of coherency messages utilized to communicate the cache state information between cache hierarchies. In a typical implementation, the coherency state information takes the form of the well-known MESI (Modified, Exclusive, Shared, Invalid) protocol or a variant thereof, and the coherency messages indicate a protocol-defined coherency state transition in the cache hierarchy of the requestor and/or the recipients of a memory access request.

The present invention appreciates that it would be useful and desirable to initialize memory blocks within an SMP computer system through the execution of an instruction. The present invention further appreciates that it would be desirable to avoid pollution of the cache hierarchies of the computer system by performing the initialization without requiring that the memory blocks be cached.

SUMMARY OF THE INVENTION

The present invention therefore provides a processor, data processing system, and method of initializing a memory block in a data processing system.

In one embodiment, in response to receiving an initialize operation from an associated processor core that indicates a target memory block to be initialized, a cache memory determines a coherency state of the target memory block. In response to a determination that the target memory block has a data-invalid coherency state with respect to the cache memory, the cache memory issues on an interconnect a corresponding initialize request indicating the target memory block. In response to the initialize request, the target memory block is initialized within a memory of the data processing system to an initialization value. The target memory block may thus be initialized without the cache memory holding a copy of the target memory block.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

FIG. 7 is a high level logical flowchart of an exemplary embodiment of a method of servicing a memory initialization request by a snooping memory controller in accordance with the present invention;

FIG. 8 is a high level logical flowchart of an exemplary embodiment of a method of servicing a memory initialization request by a snooping cache memory in accordance with the present invention; and FIG. 9 is a block diagram of program code in accordance with the present invention.

DETAILED DESCRIPTION OF ILLUSTRATIVE EMBODIMENT

I. Exemplary Data Processing System

Figure 1:
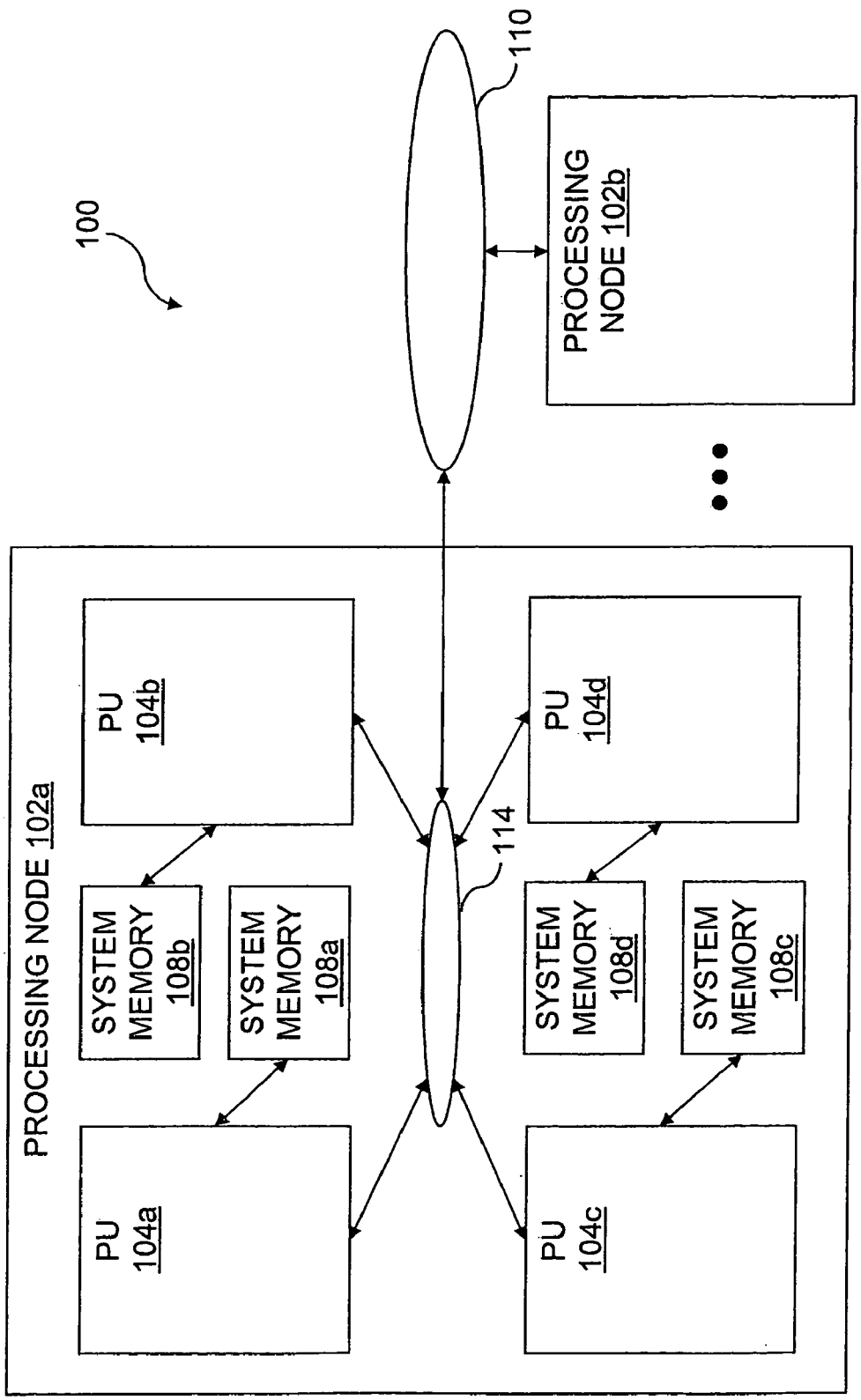
FIG. 1 is a high level block diagram of an exemplary data processing system in accordance with the present invention.

With reference now to the figures and, in particular, with reference to FIG. 1, there is illustrated a high level block diagram of an exemplary embodiment of a cache coherent symmetric multiprocessor (SMP) data processing system in accordance with the present invention. As shown, data processing system 100 includes multiple processing nodes 102a, 102b for processing data and instructions. Processing nodes 102a, 102b are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104a-104d within each processing node 102 are coupled for communication by a local interconnect 114, which, like system interconnect 110, may be implemented with one or more buses and/or switches.

The devices coupled to each local interconnect 114 include not only processing units 104, but also one or more system memories 108a-108d. Data and instructions residing in system memories 108 can generally be accessed and modified by a processor core in any processing unit 104 in any processing node 102 of data processing system 100. In alternative embodiments of the invention, one or more system memories 108 can be coupled to system interconnect 110 rather than a local interconnect 114.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Figure 2:
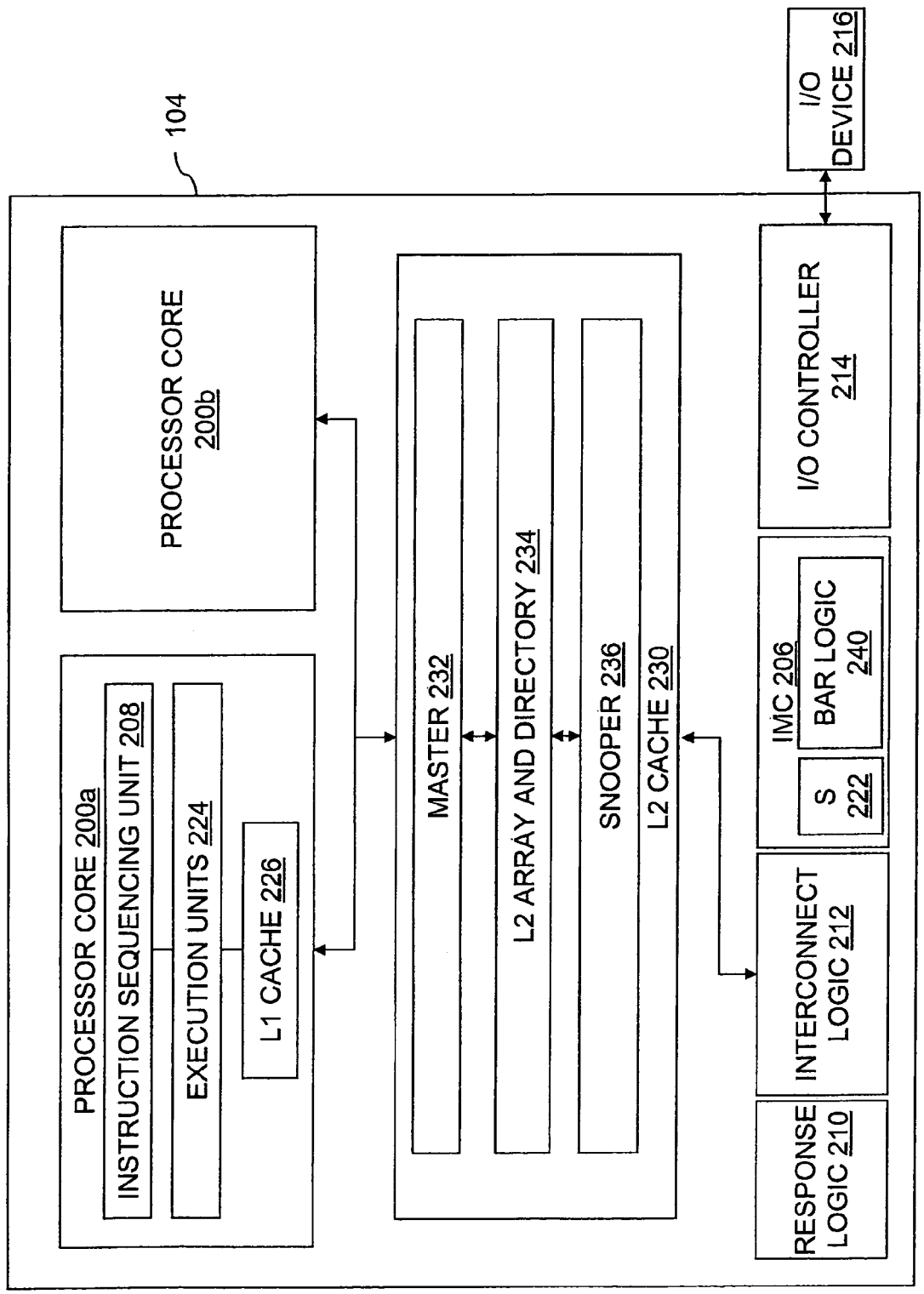
FIG. 2 is a more detailed block diagram of a processing unit in accordance with the present invention.

Referring now to FIG. 2, there is depicted a more detailed block diagram of an exemplary processing unit 104 in accordance with the present invention. In the depicted embodiment, each processing unit 104 includes two processor cores 200a, 200b for independently processing instructions and data. Each processor core 200 includes at least an instruction sequencing unit (ISU) 208 for fetching and ordering instructions for execution and one or more execution units 224 for executing instructions. As discussed further below, the instructions executed by execution units 224 include memory access instructions that request access to a memory block or cause the generation of an operation requesting access to a memory block.

The operation of each processor core 200 is supported by a multi-level volatile memory hierarchy having at its lowest level shared system memories 108a-108d, and at its upper levels one or more levels of cache memory. In the depicted embodiment, each processing unit 104 includes an integrated memory controller (IMC) 206 that controls read and write access to a respective one of the system memories 108a-108d within its processing node 102 in response to requests received from processor cores 200a-200b and operations snooped by a snooper (S) 222 on the local interconnect 114. IMC 206 determines the addresses for which it is responsible by reference to base address register (BAR) logic 240.

In the illustrative embodiment, the cache memory hierarchy of processing unit 104 includes a store-through level one (L1) cache 226 within each processor core 200 and a level two (L2) cache 230 shared by all processor cores 200a, 200b of the processing unit 104. L2 cache 230 includes an L2 array and directory 234 and a cache controller comprising a master 232 and a snooper 236. Master 232 initiates transactions on local interconnect 114 and system interconnect 110 and accesses L2 array and directory 234 in response to memory access (and other) requests received from the associated processor cores 200a-200b. Snooper 236 snoops operations on local interconnect 114, provides appropriate responses, and performs any accesses to L2 array and directory 234 required by the operations.

Although the illustrated cache hierarchy includes only two levels of cache, those skilled in the art will appreciate that alternative embodiments may include additional levels (L3, L4, L5 etc.) of on-chip or off-chip in-line or lookaside cache, which may be fully inclusive, partially inclusive, or non-inclusive of the contents the upper levels of cache.

Each processing unit 104 further includes an instance of response logic 210, which implements a portion of the distributed coherency signaling mechanism that maintains cache coherency within data processing system 100. In addition, each processing unit 104 includes an instance of interconnect logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to requests by I/O device 216.

Figure 3:
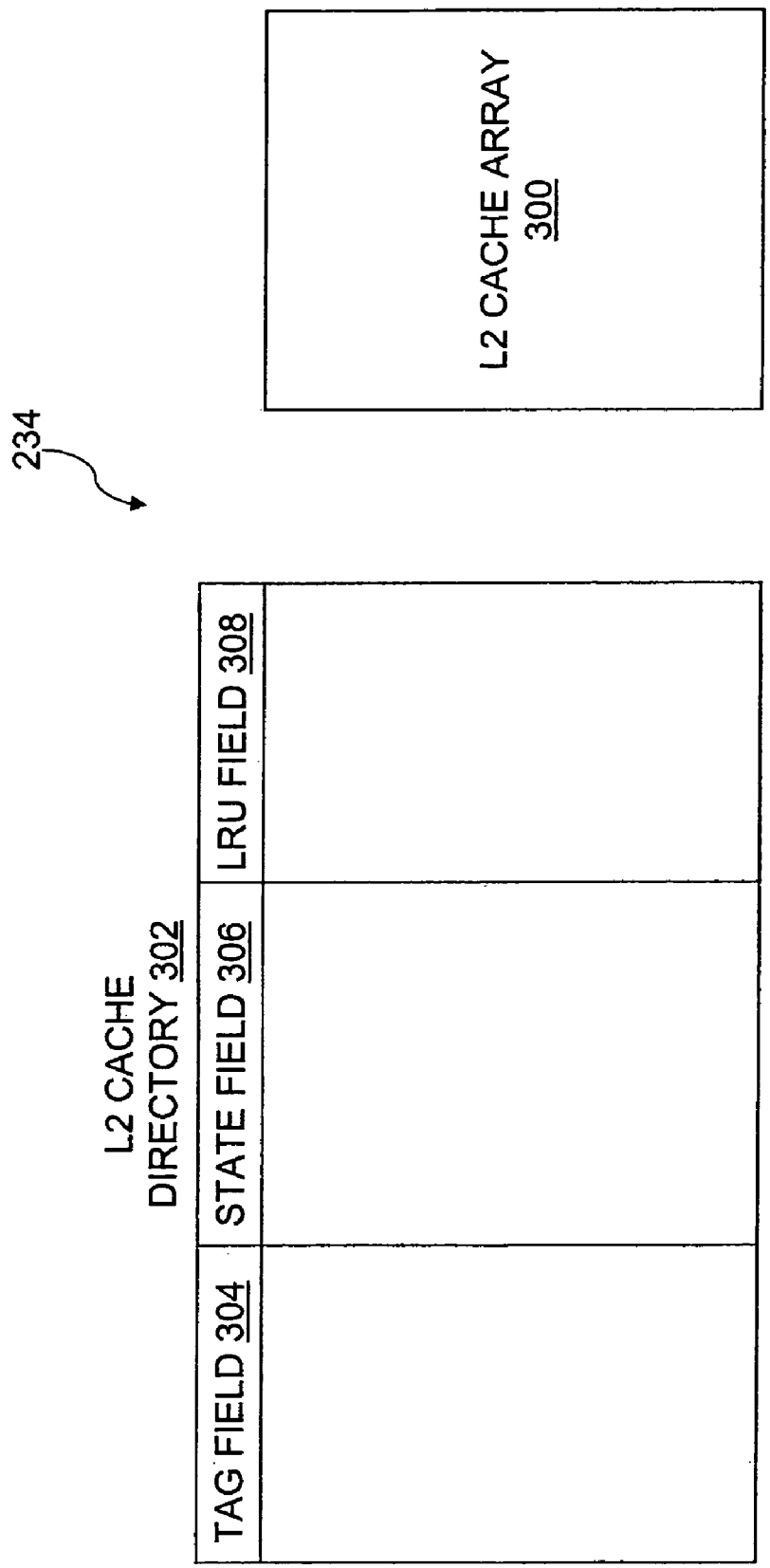
FIG. 3 is a more detailed block diagram of the L2 cache array and directory depicted in FIG. 2.

With reference now to FIG. 3, there is illustrated a more detailed block diagram of an exemplary embodiment of L2 array and directory 234. As illustrated, L2 array and directory 234 includes a set associative L2 cache array 300 and an L2 cache directory 302 of the contents of L2 cache array 300. As in conventional set associative caches, memory locations in system memories 108 are mapped to particular congruence classes within cache arrays 300 utilizing predetermined index bits within the system memory (real) addresses. The particular cache lines stored within cache array 300 are recorded in cache directory 302, which contains one directory entry for each cache line in cache array 300. As understood by those skilled in the art, each directory entry in cache directory 302 comprises at least a tag field 304, which specifies the particular cache line stored in cache array 300 utilizing a tag portion of the corresponding real address, a state field 306, which indicates the coherency state of the cache line, and a LRU (Least Recently Used) field 308 indicating a replacement order for the cache line with respect to other cache lines in the same congruence class.

II. Exemplary Operation

Figure 4:
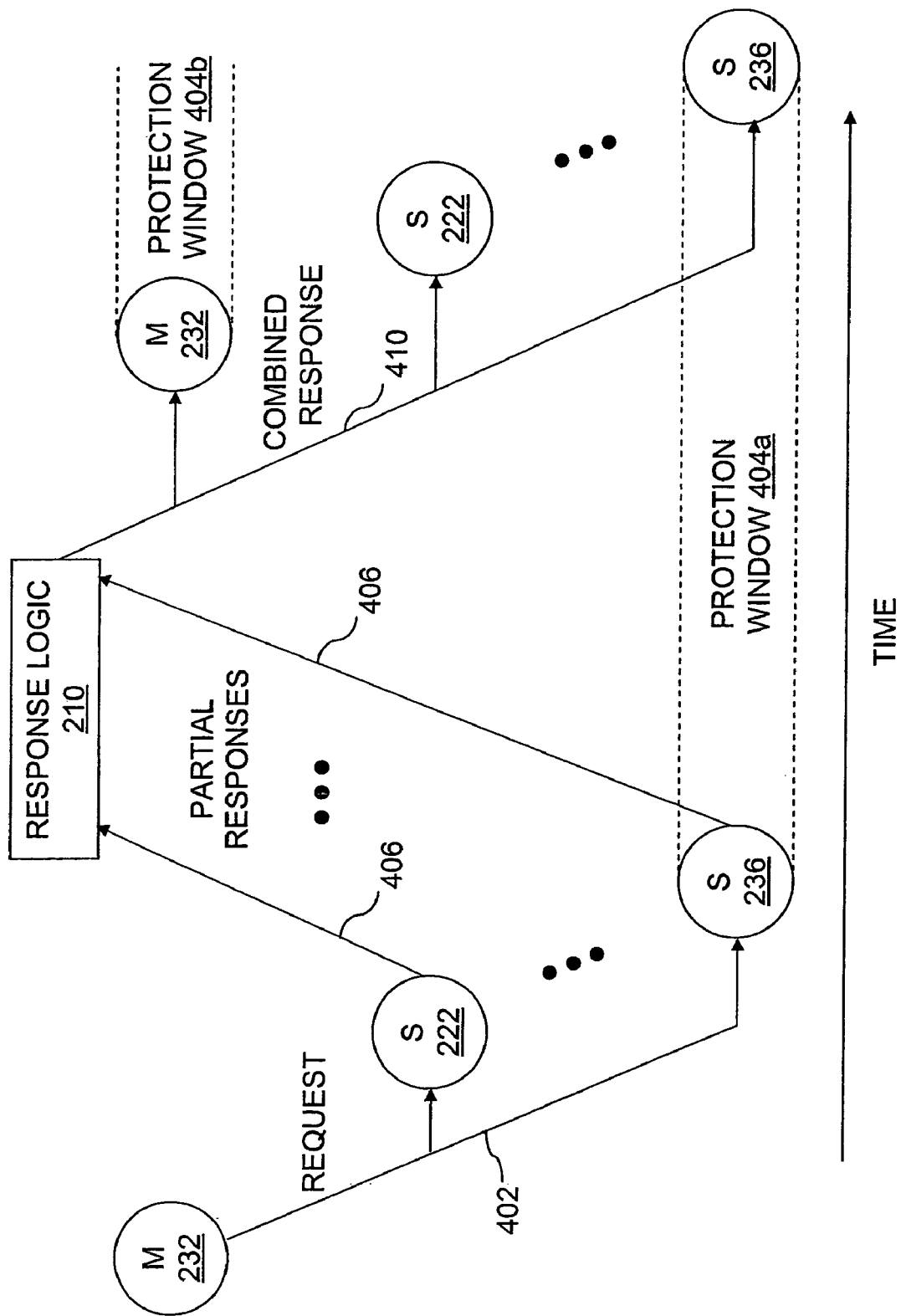
FIG. 4 is a time-space diagram of an exemplary transaction on the system interconnect of the data processing system of FIG. 1.

Referring now to FIG. 4, there is depicted a time-space diagram of an exemplary operation on a local or system interconnect 110, 114 of data processing system 100 of FIG. 1. The operation begins when a master 232 of an L2 cache 230 (or another master, such as an I/O controller 214) issues a request 402 on a local interconnect 114 and/or system interconnect 110. Request 402 preferably includes a transaction type indicating a type of desired access and a resource identifier (e.g., real address) indicating a resource to be accessed by the request. Common types of requests preferably include those set forth below in Table I.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique cached copy of a memory block without regard to its present state and subsequently modify its contents; requires destruction of other copies, if any |
| DCBN (Data Cache Block iNitialize) | Requests authority to initialize a memory block to a predetermined value; invalidates memory block copies, if any, cached other than at the master |
| CASTOUT | Copies the image of a memory block from a higher level of memory to a lower level of memory in preparation for the destruction of the higher level copy |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

Request 402 is received by the snooper 236 of L2 caches 230, as well as the snoopers 222 of memory controllers 206 (FIG. 1). In general, with some exceptions, the snooper 236 in the same L2 cache 230 as the master 232 of request 402 does not snoop request 402 (i.e., there is generally no self-snooping) because a request 402 is transmitted on local interconnect 114 and/or system interconnect 110 only if the request 402 cannot be serviced internally by a processing unit 104. Each snooper 222, 236 that receives request 402 provides a respective partial response 406 representing the response of at least that snooper to request 402. A snooper 222 within a memory controller 206 determines the partial response 406 to provide based, for example, whether the snooper 222 is responsible for the request address and whether it has resources available to service the request. A snooper 236 of an L2 cache 230 may determine its partial response 406 based on, for example, the availability of its L2 cache directory 302, the availability of a snoop logic instance within snooper 236 to handle the request, and the coherency state associated with the request address in L2 cache directory 302.

The partial responses of snoopers 222 and 236 are logically combined either in stages or all at once by one or more instances of response logic 210 to determine a system-wide combined response (CR) 410 to request 402. Subject to the scope restrictions discussed below, response logic 210 provides combined response 410 to master 232 and snoopers 222, 236 via its local interconnect 114 and/or system interconnect 110 to indicate the system-wide response (e.g., success, failure, retry, etc.) to request 402. If CR 410 indicates success of request 402, CR 410 may indicate, for example, a data source for a requested memory block, a cache state in which the requested memory block is to be cached by master 232, and whether "cleanup" operations invalidating the requested memory block in one or more L2 caches 230 are required.

In response to receipt of combined response 410, one or more of master 232 and snoopers 222, 236 typically perform one or more operations in order to service request 402. These operations may include supplying data to master 232, invalidating or otherwise updating the coherency state of data cached in one or more L2 caches 230, performing castout operations, writing back data to a system memory 108, etc. As discussed further below, if required by request 402, a requested or target memory block may be transmitted to or from master 232 before or after the generation of combined response 410 by response logic 210.

In the following description, the partial response of a snooper 222, 236 to a request and the operations performed by the snooper in response to the request and/or its combined response will be described with reference to whether that snooper is a Highest Point of Coherency (HPC), a Lowest Point of Coherency (LPC), or neither with respect to the request address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIGS. 1 and 2, the LPC will be the memory controller 206 for the system memory 108 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIGS. 1 and 2, the HPC, if any, will be an L2 cache 230. Although other indicators may be utilized to designate an HPC for a memory block, a preferred embodiment of the present invention designates the HPC, if any, for a memory block utilizing selected cache coherency state(s) within the L2 cache directory 302 of an L2 cache 230, as described further below with reference to Table II.

Still referring to FIG. 4, the HPC, if any, for a memory block referenced in a request 402, or in the absence of an HPC, the LPC of the memory block, preferably has the responsibility of protecting the transfer of ownership of a memory block in response to a request 402 during a protection window 404a. In the exemplary scenario shown in FIG. 4, the snooper 236 that is the HPC for the memory block specified by the request address of request 402 protects the transfer of ownership of the requested memory block to master 232 during a protection window 404a that extends from the time that snooper 236 determines its partial response 406 until snooper 236 receives combined response 410. During protection window 404a, snooper 236 protects the transfer of ownership by providing partial responses 406 to other requests specifying the same request address that prevent other masters from obtaining ownership until ownership has been successfully transferred to master 232. Master 232 likewise initiates a protection window 404b to protect its ownership of the memory block requested in request 402 following receipt of combined response 410.

Because snoopers 222, 236 all have limited resources for handling the CPU and I/O requests described above, several different levels of partial responses and corresponding CRs are possible. For example, if a snooper 222 within a memory controller 206 that is responsible for a requested memory block has a queue available to handle a request, the snooper 222 may respond with a partial response indicating that it is able to serve as the LPC for the request. If, on the other hand, the snooper 222 has no queue available to handle the request, the snooper 222 may respond with a partial response indicating that is the LPC for the memory block, but is unable to currently service the request.

Similarly, a snooper 236 in an L2 cache 230 may require an available instance of snoop logic and access to L2 cache directory 302 in order to handle a request. Absence of access to either (or both) of these resources results in a partial response (and corresponding CR) signaling an inability to service the request due to absence of a required resource.

Hereafter, a snooper 222, 236 providing a partial response indicating that the snooper has available all internal resources required to service a request, if required, is said to "affirm" the request. For snoopers 236, partial responses affirming a snooped operation preferably indicate the cache state of the requested or target memory block at that snooper 236. A snooper 222, 236 providing a partial response indicating that the snooper 236 does not have available all internal resources required to service the request may be said to be "possibly hidden." Such a snooper 236 is "possibly hidden" because the snooper 236, due to lack of an available instance of snoop logic or access to L2 cache directory 302, cannot "affirm" the request in sense defined above and has, from the perspective of other masters 232 and snoopers 222, 236, an unknown coherency state.

III. Data Delivery Domains

Conventional broadcast-based data processing systems handle both cache coherency and data delivery through broadcast communication, which in conventional systems is transmitted on a system interconnect to at least all memory controllers and cache hierarchies in the system. As compared with systems of alternative architectures and like scale, broadcast-based systems tend to offer decreased access latency and better data handling and coherency management of shared memory blocks.

As broadcast-based system scale in size, traffic volume on the system interconnect is multiplied, meaning that system cost rises sharply with system scale as more bandwidth is required for communication over the system interconnect. That is, a system with m processor cores, each having an average traffic volume of n transactions, has a traffic volume of m×n, meaning that traffic volume in broadcast-based systems scales multiplicatively not additively. Beyond the requirement for substantially greater interconnect bandwidth, an increase in system size has the secondary effect of increasing some access latencies. For example, the access latency of read data is limited, in the worst case, by the combined response latency of the furthest away lower level cache holding the requested memory block in a shared coherency state from which the requested data can be sourced.

In order to reduce system interconnect bandwidth requirements and access latencies while still retaining the advantages of a broadcast-based system, the present invention reduces data access latency by decreasing the average distance between a requesting L2 cache 230 and an data source. One technique for do so is to reducing the average distance between a requesting L2 cache 230 and a data source is to permit multiple L2 caches 230 distributed throughout data processing system 100 to hold copies of the same memory block in a "special" shared coherency state that permits these caches to supply the memory block to requesting L2 caches 230 using cache-to-cache intervention.

In order to implement multiple concurrent and distributed sources for shared memory blocks in an SMP data processing system, such as data processing system 100, two issues must be addressed. First, some rule governing the creation of copies of memory blocks in the "special" shared coherency state alluded to above must be implemented. Second, there must be a rule governing which snooping L2 cache 230, if any, provides a shared memory block to a requesting L2 cache 230, for example, in response to a bus read operation or bus RWITM operation.

According to the present invention, both of these issues are addressed through the implementation of data sourcing domains. In particular, each domain within a SMP data processing system, where a domain is defined to include one or more lower level (e.g., L2) caches that participate in responding to data requests, is permitted to include only one cache hierarchy that holds a particular memory block in the "special" shared coherency state at a time. That cache hierarchy, if present when a bus read-type (e.g., read or RWITM) operation is initiated by a requesting lower level cache in the same domain, is responsible for sourcing the requested memory block to the requesting lower level cache. Although many different domain sizes may be defined, in data processing system 100 of FIG. 1, it is convenient if each processing node 102 (i.e., MCM) is considered a data sourcing domain. One example of such a "special" shared state (i.e., Sr) is described below with reference to Table II.

IV. Coherency Domains

While the implementation of data delivery domains as described above improves data access latency, this enhancement does not address the m×n multiplication of traffic volume as system scale increases. In order to reduce traffic volume while still maintaining a broadcast-based coherency mechanism, preferred embodiments of the present invention additionally implement coherency domains, which like the data delivery domains hereinbefore described, can conveniently (but are not required to be) implemented with each processing node 102 forming a separate coherency domain. Data delivery domains and coherency domains can be, but are not required to be coextensive, and for the purposes of explaining exemplary operation of data processing system 100 will hereafter be assumed to have boundaries defined by processing nodes 102.

The implementation of coherency domains reduces system traffic by limiting inter-domain broadcast communication over system interconnect 110 in cases in which requests can be serviced with participation by fewer than all coherency domains. For example, if processing unit 104a of processing node 102a has a bus read operation to issue, then processing unit 104a may elect to first broadcast the bus read operation to all participants within its own coherency domain (e.g., processing node 102a), but not to participants in other coherency domains (e.g., processing node 102b). A broadcast operation transmitted to only those participants within the same coherency domain as the master of the operation is defined herein as a "local operation". If the local bus read operation can be serviced within the coherency domain of processing unit 104a, then no further broadcast of the bus read operation is performed. If, however, the partial responses and combined response to the local bus read operation indicate that the bus read operation cannot be serviced solely within the coherency domain of processing node 102a, the scope of the broadcast may then be extended to include, in addition to the local coherency domain, one or more additional coherency domains.

In a basic implementation, two broadcast scopes are employed: a "local" scope including only the local coherency domain and a "global" scope including all of the other coherency domains in the SMP data processing system. Thus, an operation that is transmitted to all coherency domains in an SMP data processing system is defined herein as a "global operation". Importantly, regardless of whether local operations or operations of more expansive scope (e.g., global operations) are employed to service operations, cache coherency is maintained across all coherency domains in the SMP data processing system.

In a preferred embodiment, the scope of an operation is indicated in a bus operation by a local/global indicator (signal), which in one embodiment may comprise a 1-bit flag. Forwarding logic 212 within processing units 104 preferably determines whether or not to forward an operation received via local interconnect 114 onto system interconnect 110 based upon the setting of the local/global indicator (signal) in the operation.

V. Domain Indicators

Figure 5:
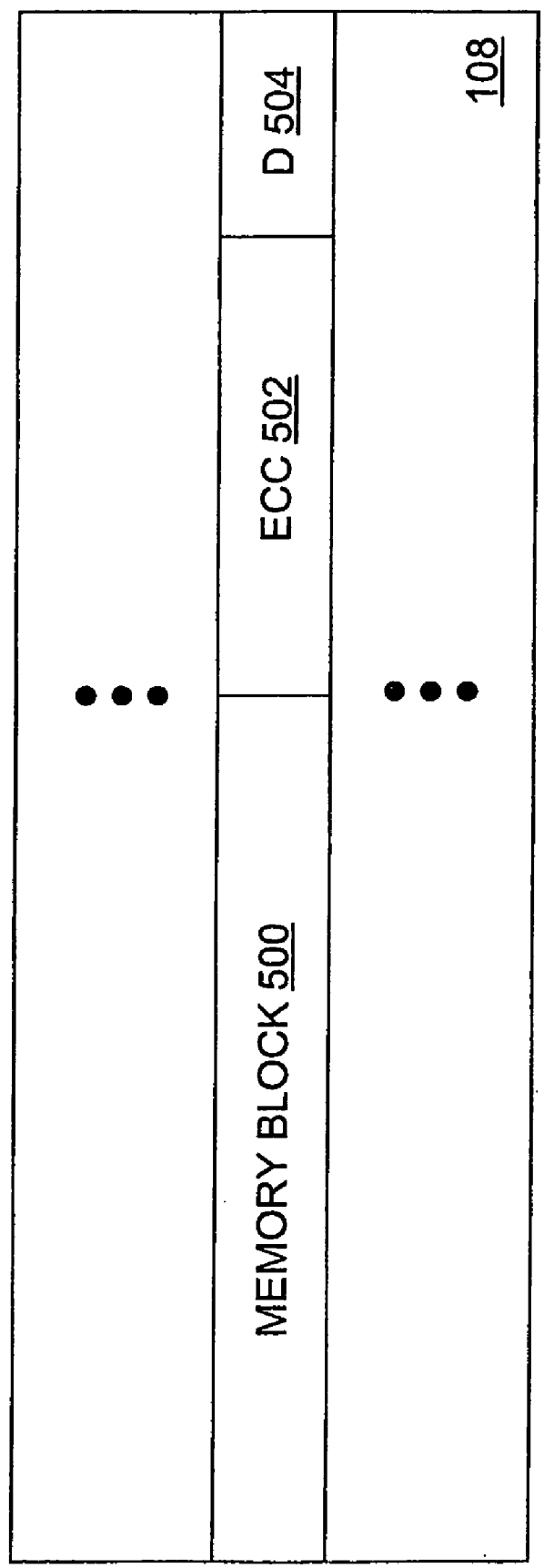
FIG. 5 illustrates a domain indicator in accordance with a preferred embodiment of the present invention.

In order to limit the issuance of unneeded local operations and thereby reduce operational latency and conserve additional bandwidth on local interconnects, the present invention preferably implements a domain indicator per memory block that indicates whether or not a copy of the associated memory block is cached outside of the local coherency domain. For example, FIG. 5 depicts a first exemplary implementation of a domain indicator in accordance with the present invention. As shown in FIG. 5, a system memory 108, which may be implemented in dynamic random access memory (DRAM), stores a plurality of memory blocks 500. System memory 108 stores in association with each memory block 500 an associated error correcting code (ECC) 502 utilized to correct errors, if any, in memory block 500 and a domain indicator 504. Although in some embodiments of the present invention, domain indicator 504 may identify a particular coherency domain (i.e., specify a coherency domain or node ID), it is hereafter assumed that domain indicator 504 is a 1-bit indicator that is set (e.g., to '1' to indicate "local") if the associated memory block 500 is cached, if at all, only within the same coherency domain as the memory controller 206 serving as the LPC for the memory block 500. Domain indicator 504 is reset (e.g., to '0' to indicate "global") otherwise. The setting of domain indicators 504 to indicate "local" may be implemented imprecisely in that a false setting of "global" will not induce any coherency errors, but may cause unneeded global broadcasts of operations.

Memory controllers 206 (and L2 caches 230) that source a memory block in response to an operation preferably transmit the associated domain indicator 504 in conjunction with the requested memory block.

VI. Exemplary Coherency Protocol

The present invention preferably implements a cache coherency protocol designed to leverage the implementation of data delivery and coherency domains as described above. In a preferred embodiment, the cache coherency states within the protocol, in addition to providing (1) an indication of whether a cache is the HPC for a memory block, also indicate (2) whether the cached copy is unique (i.e., is the only cached copy system-wide) among caches at that memory hierarchy level, (3) whether and when the cache can provide a copy of the memory block to a master of a request for the memory block, (4) whether the cached image of the memory block is consistent with the corresponding memory block at the LPC (system memory), and (5) whether another cache in a remote coherency domain (possibly) holds a cache entry having a matching address. These five attributes can be expressed, for example, in an exemplary variant of the well-known MESI (Modified, Exclusive, Shared, Invalid) protocol summarized below in Table II.

TABLE II

| Cache state | HPC? | Unique? | Data source? | Consistent with LPC? | Cached outside local domain? | Legal concurrent states |
| --- | --- | --- | --- | --- | --- | --- |
| M | yes | yes | yes, before CR | no | no | I, Ig, In (& LPC) |
| Me | yes | yes | yes, before CR | yes | no | I, Ig, In (& LPC) |
| T | yes | unknown | yes, after CR if none provided before CR | no | unknown | Sr, S, I, Ig, In (& LPC) |
| Tn | yes | unknown | yes, after CR if none provided before CR | no | no | Sr, S, I, Ig, In (& LPC) |
| Te | yes | unknown | yes, after CR if none provided before CR | yes | unknown | Sr, S, I, Ig, In (& LPC) |

TABLE II-continued

| Cache state | HPC? | Unique? | Data source? | Consistent with LPC? | Cached outside local domain? | Legal concurrent states |
|---|---|---|---|---|---|---|
| Ten | yes | unknown | yes, after CR if none provided before CR | yes | no | Sr, S, I, Ig, In (& LPC) |
| Sr | no | unknown | yes, before CR | unknown | unknown | T, Tn, Te, Ten, S, I, Ig, In (& LPC) |
| S | no | unknown | no | unknown | unknown | T, Tn, Te, Ten, Sr, S, I, Ig, In (& LPC) |
| I | no | n/a | no | n/a | unknown | M, Me, T, Tn, Te, Ten, Sr, S, I, Ig, In (& LPC) |
| Ig | no | n/a | no | n/a | Assumed so, in absence of other information | M, Me, T, Tn, Te, Ten, Sr, S, I, Ig, In (& LPC) |
| In | no | n/a | no | n/a | Assumed not, in absence of other information | M, Me, T, Tn, Te, Ten, Sr, S, I, Ig, In (& LPC) |

A. Ig State

In order to avoid having to access the LPC to determine whether or not the memory block is known to be cached, if at all, only locally, the Ig (Invalid global) coherency state is utilized to maintain a domain indication in cases in which no copy of a memory block remains cached in a coherency domain. The Ig state is defined herein as a cache coherency state indicating (1) the associated memory block in the cache array is invalid, (2) the address tag in the cache directory is valid, and (3) a copy of the memory block identified by the address tag may possibly be cached in another coherency domain. The Ig indication is preferably imprecise, meaning that it may be incorrect without a violation of coherency.

The Ig state is formed in a lower level cache in response to that cache providing a requested memory block to a requestor in another coherency domain in response to an exclusive access request (e.g., a bus RWITM operation). In some embodiments of the present invention, it may be preferable to form the Ig state only in the coherency domain containing the LPC for the memory block. In such embodiments, some mechanism (e.g., a partial response by the LPC and subsequent combined response) must be implemented to indicate to the cache sourcing the requested memory block that the LPC is within its local coherency domain. In other embodiments that do not support the communication of an indication that the LPC is local, an Ig state may be formed any time that a cache sources a memory block to a remote coherency domain in response to an exclusive access request.

Because cache directory entries including an Ig state carry potentially useful information, it is desirable in at least some implementations to preferentially retain entries in the Ig state over entries in the I state (e.g., by modifying the Least Recently Used (LRU) algorithm utilized to select a victim cache entry for replacement). As Ig directory entries are retained in cache, it is possible for some Ig entries to become "stale" over time in that a cache whose exclusive access request caused the formation of the Ig state may deallocate or writeback its copy of the memory block without notification to the cache holding the address tag of the memory block in the Ig state. In such cases, the "stale" Ig state, which incorrectly indicates that a global operation should be issued instead of a local operation, will not cause any coherency errors, but will merely cause some operations, which could otherwise be serviced utilizing a local operation, to be issued as global operations. Occurrences of such inefficiencies will be limited in duration by the eventual replacement of the "stale" Ig cache entries.

Several rules govern the selection and replacement of Ig cache entries. First, if a cache selects an Ig entry as the victim for replacement, a castout of the Ig entry is performed (unlike the case when an I entry is selected). Second, if a request that causes a memory block to be loaded into a cache hits on an Ig cache entry in that same cache, the cache treats the Ig hit as a cache miss and performs a castout operation with the Ig entry as the selected victim. The cache thus avoids avoid placing two copies of the same address tag in the cache directory. Third, the castout of the Ig state is preferably performed as a local operation, or if performed as a global operation, ignored by memory controllers of non-local coherency domains. If an Ig entry is permitted to form in a cache that is not within the same coherency domain as the LPC for the memory block, no update to the domain indicator in the LPC is required. Fourth, the castout of the Ig state is preferably performed as a dataless address-only operation in which the domain indicator is written back to the LPC (if local to the cache performing the castout).

Implementation of an Ig state in accordance with the present invention improves communication efficiency by maintaining a cached domain indicator for a memory block in a coherency domain even when no valid copy of the memory block remains cached in the coherency domain. As a consequence, an HPC for a memory block can service an exclusive access request (e.g., bus RWITM operation) from a remote coherency domain without retrying the request and performing a push of the requested memory block to the LPC.

B. In State

The In state is defined herein as a cache coherency state indicating (1) the associated memory block in the cache array is invalid, (2) the address tag in the cache directory is valid, and (3) a copy of the memory block identified by the address tag is likely cached, if at all, only by one or more other cache hierarchies within the local coherency domain. The In indication is preferably imprecise, meaning that it may be incorrect without a violation of coherency. The In state is formed in a lower level cache in response to that cache providing a requested memory block to a requester in the same coherency domain in response to an exclusive access request (e.g., a bus RWITM operation).

Because cache directory entries including an In state carry potentially useful information, it is desirable in at least some implementations to preferentially retain entries in the In state over entries in the I state (e.g., by modifying the Least Recently Used (LRU) algorithm utilized to select a victim cache entry for replacement). As In directory entries are retained in cache, it is possible for some In entries to become "stale" over time in that a cache whose exclusive access request caused the formation of the In state may itself supply a shared copy of the memory block to a remote coherency domain without notification to the cache holding the address tag of the memory block in the In state. In such cases, the "stale" In state, which incorrectly indicates that a local operation should be issued instead of a global operation, will not cause any coherency errors, but will merely cause some operations to be erroneously first issued as local operations, rather than as global operations. Occurrences of such inefficiencies will be limited in duration by the eventual replacement of the "stale" In cache entries. In a preferred embodiment, cache entries in the In coherency state are not subject to castout, but are instead simply replaced. Thus, unlike Ig cache entries, In cache entries are not utilized to update domain indicators 504 in system memories 108.

Implementation of an In state in accordance with the present invention improves communication efficiency by maintaining a cached domain indicator for a memory block that may be consulted by a master in order to select a local scope for one of its operations. As a consequence, bandwidth on system interconnect 110 and local interconnects 114 in other coherency domains is conserved.

C. Sr State

In the operations described below, it is useful to be able to determine whether or not a lower level cache holding a shared requested memory block in the Sr coherency state is located within the same domain as the requesting master. In one embodiment, the presence of a "local" Sr snooper within the same domain as the requesting master can be indicated by the response behavior of a snooper at a lower level cache holding a requested memory block in the Sr coherency state. For example, assuming that each bus operation includes a scope indicator indicating whether the bus operation has crossed a domain boundary (e.g., an explicit domain identifier of the master or a single local/not local bit), a lower level cache holding a shared memory block in the Sr coherency state can provide a partial response affirming the request in the Sr state only for requests by masters within the same data sourcing domain and provide partial responses indicating the S state for all other requests. In such embodiments the response behavior can be summarized as shown in Table III, where prime (') notation is utilized to designate partial responses that may differ from the actual cache state of the memory block.

TABLE III

| Domain of master of read-type request | Cache state in directory | Partial response (adequate resources available) | Partial response (adequate resources unavailable) |
|---|---|---|---|
| "local" (i.e., within same domain) | Sr | Sr' affirm | Sr' possibly hidden |
| "remote" (i.e., not within same domain) | Sr | S' affirm | S' possibly hidden |

TABLE III-continued

| Domain of master of read-type request | Cache state in directory | Partial response (adequate resources available) | Partial response (adequate resources unavailable) |
|---|---|---|---|
| "local" (i.e., within same domain) | S | S' affirm | S' possibly hidden |
| "remote" (i.e., not within same domain) | S | S' affirm | S' possibly hidden |

Assuming the response behavior set forth above in Table III, the average data latency for shared data can be significantly decreased by increasing the number of shared copies of memory blocks distributed within an SMP data processing system that may serve as data sources.

VII. Initialization of Memory Blocks

Figure 6:
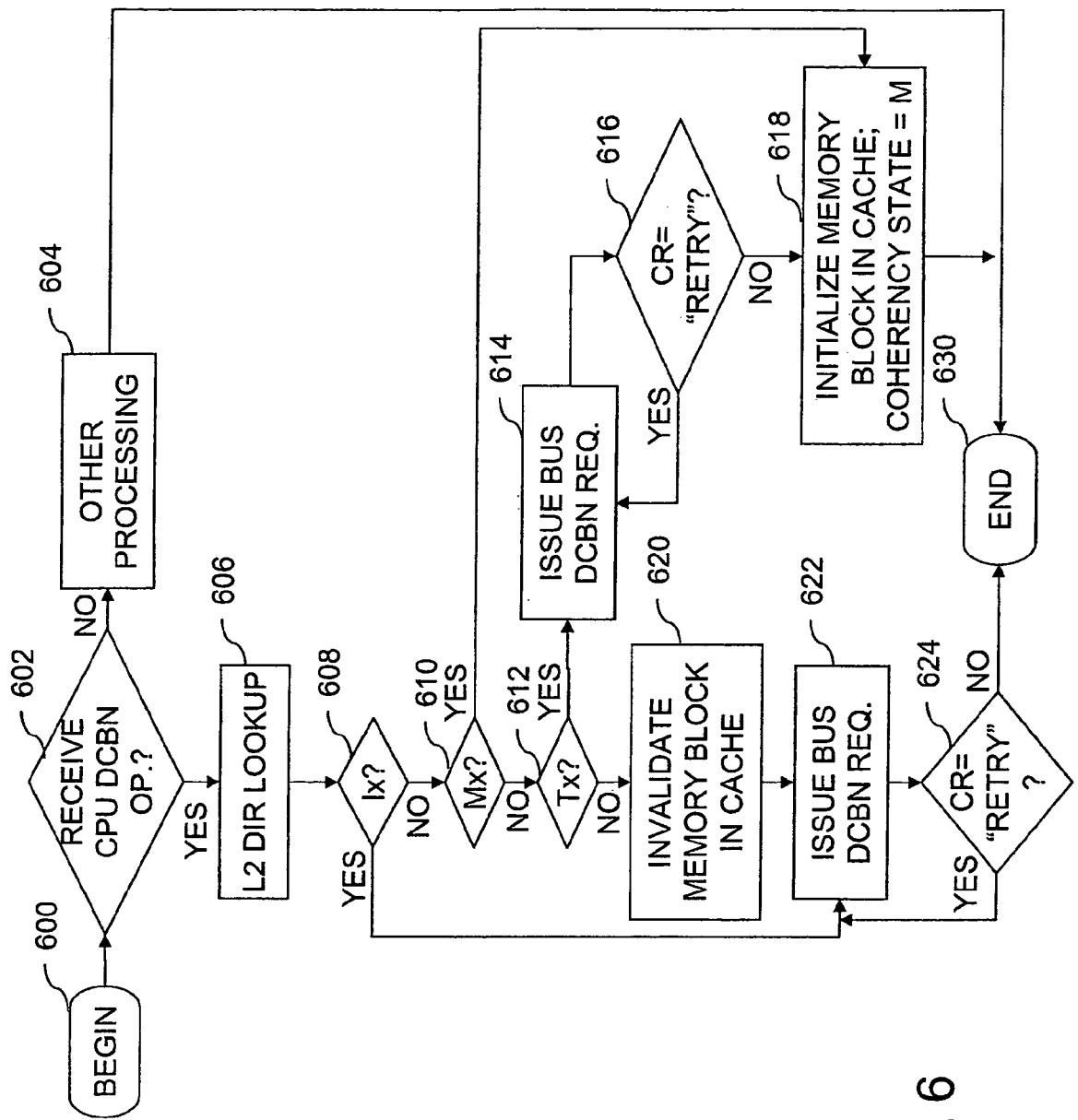
FIG. 6 is a high level logical flowchart of an exemplary embodiment of a method by which a cache memory services a memory initialization operation of an associated processor core in accordance with the present invention.

Referring generally to FIGS. 6-8, there are depicted high level logical flowcharts that depict an exemplary method of servicing a memory initialization operation in a multiprocessor data processing system. As logical flowcharts, those skilled in the art will appreciate that the illustrated ordering of steps represent a logical sequence and that in particular implementations of the present invention, some of the illustrated steps may be performed concurrently or in an alternative order.

Referring now specifically to FIG. 6, there is depicted a high level logical flowchart of an exemplary embodiment of a method by which a cache memory services a memory initialization operation received from an associated processor core in accordance with the present invention. The illustrated process begins at block 600 in response to receipt by a master 232 of an L2 cache 230 of a CPU operation from one of the associated processor cores 200 within its processing unit 104. The process then proceeds to block 602, which depicts the master 232 determining whether or not the operation is a CPU DCBN (Data Cache Block iNitialize) operation, received, for example, in response to execution of a corresponding DCBN instruction by the source processor core 200.

FIG. 9 illustrates an exemplary DCBN instruction 902 forming a portion of computer usable program code 900 stored at least partially within a system memory 108 and subject to execution or processing by processor cores 200. The exemplary DCBN instruction preferably includes an operation code (represented in FIG. 9 by the mnemonic "dcbn") identifying the instruction as a DCBN instruction and an indication of a target real address of a target memory block to be initialized. The target real address is preferably indicated in a conventional manner by one or more of the instruction input operands op1, op2 and op3. The input operands may optionally indicate additional information, for example, an indication of an address range of target memory blocks to be initialized and/or an indication of an initialization value to which the target memory blocks are to be initialized (e.g., all 0s, all 1s, or a register-specified value). If no initialization value is explicitly indicated, the operation code of the DCBN instruction may imply a default value (e.g., all 0s or all 1s).

In a preferred embodiment, the CPU DCBN operation sent by a processor core 200 to a master 232 in response to the execution of a DCBN instruction similarly includes at least an operation code identifying the memory access operation as a CPU DCBN operation and an indication of a target real address of a target memory block to be initialized.

The CPU DCBN operation may optionally indicate additional information, for example, an indication of an address range of target memory blocks to be initialized and/or an indication of an initialization value to which the target memory blocks are to be initialized (e.g., all 0s, all 1s, or a register-specified value). If no initialization value is explicitly indicated, the operation code of the CPU DCBN operation may imply a default value (e.g., all 0s or all 1s).

In response to a determination at block 602 that the CPU operation received by the master 232 is not a CPU DCBN operation, the process proceeds to block 604, which represents master 232 performing other processing in accordance with the operation type of the received CPU operation. The process then terminates at block 630.

Returning to block 602, in response to a determination that the received operation is a CPU DCBN operation, master 232 initiates a lookup of L2 cache directory 302 at block 606 to determine the coherency state, if any, recorded within L2 cache directory 302 for the target address specified by the CPU DCBN operation. If L2 cache directory 302 indicates that the target address is not associated with any data-valid coherency state (e.g., M, Me, T, Tn, Te, Ten, Sr, or S) but is instead associated with a data-invalid coherency state (e.g., I, Ig or In), then the process proceeds to block 622, which depicts master 232 issuing a DCBN request of global scope on its local interconnect 114 and system interconnect 110. Although interconnects 114, 110 are not necessarily bused interconnects, such requests are designated herein as bus DCBN requests to differentiate them from processor-executed DCBN instructions and the CPU DCBN operations received by masters 232 from processor cores 200.

In a preferred embodiment, the bus DCBN request issued on interconnects 110, 114 includes at least a request vector identifying the request as a bus DCBN request and an indication of the target real address of the target memory block. Like the CPU DCBN operation described above, the bus DCBN request may optionally indicate additional information, for example, an indication of an address range of target memory blocks to be initialized and/or an indication of an initialization value to which the target memory blocks are to be initialized (e.g., all 0s, all 1s, or a specified value). If no initialization value is explicitly indicated, the request vector of the bus DCBN request may imply a default value (e.g., all 0s or all 1s)

Following block 622, master 232 awaits the combined response of the CPU DCBN request. If the combined response (CR) indicates "retry", meaning that at least one snooper 236, 222 provided a partial response indicating "retry", then master 232 reissues the CPU DCBN request, as indicated by the process returning from block 624 to block 622. If, on the other hand, the combined response is other than "retry", then the initialization of the target memory block was successful, and the process ends at block 630. It should be noted that when the requesting L2 cache 230 does not hold a copy of the target memory block of a CPU DCBN operation, the requesting L2 cache 230 is not required to "pollute" its L2 cache array 300 by loading a copy of the target memory block in order to service the CPU DCBN operation. Instead, the requesting L2 cache 230 services the CPU DCBN operation by simply issuing one or more corresponding bus DCBN requests until a combined response other than "retry" is received.

Returning to block 608, in response to master 232 determining that the target address hit in L2 cache directory 302 in a data-valid coherency state, master 232 services the CPU DCBN operation in accordance with the coherency state of the target memory block. If the coherency state of the target memory block is Mx (e.g., M or Me), master 232 simply initializes the target memory block by writing the target memory block with the appropriate initialization value, as shown at block 618. If not already set to M, the coherency state of the target memory block is updated to M to indicate that the target memory block is now inconsistent with the corresponding memory block in system memory 108. Thereafter, the process ends at block 630.

Referring now to block 612, if master 232 determines that the coherency state of the target memory block is not Mx or Tx (e.g., S or Sr), master 232 updates the coherency state of the target cache block within its L2 cache directory 302 to the I coherency state, as illustrated at block 620. Thereafter, the process passes to block 622 and following blocks, which have been described. Thus, if the requesting L2 cache 230 holds the target memory block in a non-HPC data-valid coherency state, the requesting L2 cache 230 preferably does not expend its resources and interconnect bandwidth obtaining permission to modify its copy of the target memory block in order to service the CPU DCBN operation. Instead, the requesting L2 cache 230 preferably services the CPU DCBN operation by simply invalidating its copy of the target memory block and issuing one or more corresponding bus DCBN requests until a combined response other than "retry" is received.

Referring again to block 612, if master 232 determines that the coherency state of the target memory block in its L2 cache directory 302 is Tx (e.g., T, Tn, Te, or Ten), master 232 issues a bus DCBN request of global scope on its local interconnect 114 and system interconnect 110, as shown at block 614. Following block 614, master 232 awaits the combined response of its CPU DCBN request. In response to receipt of the combined response (CR), master 232 determines at block 616 if the combined response (CR) indicates "retry". If so, master 232 reissues the CPU DCBN request, as indicated by the process returning from block 616 to block 614. Reissuing the bus DCBN request in this manner ensures that each other L2 cache 230 holding a copy of the target memory block commits to update its respective copy of the target memory block to a data-invalid state prior to the initialization of the target memory block by the requesting L2 cache 230. If, on the other hand, master 232 determines at block 616 that the combined response does not indicate "retry", then master 232 initializes the target memory block by writing the target memory block with the appropriate initialization value, as shown at block 618. Master 232 also updates the coherency state of the target cache line in its L2 cache directory 302 to M (although this update is not required to maintain coherency for a target memory block in the T or Tn coherency state and may therefore be omitted for such memory blocks). Thereafter, the process ends at block 630.

With reference now to FIG. 7, there is illustrated a high level logical flowchart of an exemplary embodiment of a method by which a memory controller, such as an integrated memory controller 206, services a memory initialization request in accordance with the present invention. The illustrated process begins at block 700 in response to receipt by snooper 222 in IMC 206 of a memory access request. The process then proceeds to block 702, which depicts snooper 222 determining whether or not the memory access request is a bus DCBN request. If so, the process proceeds to block 710, which is described below. If not, the process passes to block 704, which depicts snooper 222 processing the request in accordance with its request type. The process thereafter terminates at block 730.

Referring now to block 710, if the received request is a bus DCBN request, snooper 222 determines whether it has sufficient resources available to service the bus DCBN request. If not, snooper 222 provides a partial response indicating "retry", as shown at block 712. Thereafter, processing terminates at block 730. If, however, snooper 222 determines at block 710 that it has sufficient available resources to service the bus DCBN request, snooper 222 determines whether or not it is the LPC for the target address specified by the bus DCBN request by reference to BAR logic 240 (block 714). If snooper 222 determines that it is not the LPC for the specified target memory block, processing terminates at block 730. If, however, snooper 222 determines that it is the LPC for the target memory block, snooper 222 waits to receive the combined response for the bus DCBN request, as shown at block 722. If the combined response indicates "retry", then processing ends at block 730. If, however, the combined response does not indicate "retry", snooper 222 updates the target memory block in system memory 108 to the appropriate initialization value, as depicted at block 726. The process then terminates at block 730.

It will be appreciated that in alternative embodiments of the present invention, snooper 222 need not initialize the copy of the memory block in system memory 108 in response to each bus DCBN operation that does not receive a "retry" combined response. In particular, if the partial responses generated by snoopers 236 and the combined response generated by response logic 210 indicate the presence of an HPC that will initialize its copy of the target memory block in response to the bus DCBN operation, the initialization of the system memory copy of the target memory block may be eliminated or selectively performed based upon the availability of resources.

Referring now to FIG. 8, there is depicted a high level logical flowchart of an exemplary embodiment of a method by which a cache memory services a memory initialization request snooped on an interconnect in accordance with the present invention. The illustrated process begins at block 800 in response to receipt by a snooper 236 of an L2 cache 230 of a request on its local interconnect 114. The process then proceeds to block 802, which depicts the snooper 236 determining whether or not the received operation is a bus DCBN request. If not, the process proceeds to block 804, which represents snooper 236 performing other processing in accordance with the request type of the received request. The process then terminates at block 850.

Returning to block 802, in response to a determination that the received operation is a bus DCBN request, snooper 236 determines whether it has sufficient resources available to service the bus DCBN request. If not, snooper 236 provides a partial response indicating "retry", as shown at block 812. Thereafter, processing terminates at block 850. If, however, snooper 236 determines at block 810 that it has sufficient available resources to service the bus DCBN request, snooper 236 initiates a lookup of L2 cache directory 302 at block 812 to determine the coherency state, if any, recorded for the target address specified by the bus DCBN request. If the L2 cache directory 302 indicates that the target address is associated with an Mx coherency state (e.g., M or Me), snooper 236 initializes the target memory block in its L2 cache array 230, as shown at block 816. Thereafter, processing ends at block 850. If the coherency state of the target memory block is not Mx, but is instead Tx (block 820), the process passes to block 822.

Block 822 depicts snooper 236 awaiting receipt of the combined response of the bus DCBN request. As indicated at block 824, if the combined response does not indicate "retry", meaning that each other cached copy of the target memory block if any has been invalidated, snooper 236 initializes the target memory block to the appropriate initialization value, as depicted at block 826. Thereafter, the process terminates at block 850. However, if snooper 236 receives a combined response that indicates "retry" at block 824, snooper 236 does not initialize the target memory block, and processing ends at block 850 until the bus DCBN request is reissued.

Referring again to block 820, if snooper 236 determines that the target memory block is not associated with a Tx coherency state in its L2 cache directory 302, snooper 236 determines if the coherency state of the target memory block is Sx (e.g., S or Sr). If not, the process terminates at block 850. If, however, the target memory block is associated with an Sx coherency state in L2 cache directory 302, snooper 236 invalidate the Sx copy of the target memory block (block 842). Thereafter, the process ends at block 850.

As has been described, the present invention provides a processing unit, data processing system and method of initializing a target memory block. Advantageously, the present invention permits the memory block to be initialized without requiring the requesting cache memory to hold a valid copy of the target memory block before or after the initialization. Furthermore, in selected operating scenarios, the target memory block may be initialized without updating the copy of the target memory block held in system memory.

While the invention has been particularly shown as described with reference to a preferred embodiment, it will be understood by those skilled in the art that various changes in form and detail may be made therein without departing from the spirit and scope of the invention. For example, although aspects of the present invention have been described with respect to a computer system executing program code that directs the functions of the present invention, it should be understood that present invention may alternatively be implemented as a program product for use with a data processing system. Program code defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method of data processing in a data processing system, said method comprising:

in response to receipt by a cache memory of an initialization operation from an associated processor core, said initialization operation indicating a target memory block to be initialized, the cache memory determining a coherency state of said target memory block with respect to said cache memory;

in response to a determination that said target memory block has a data-invalid coherency state with respect to said cache memory, said cache memory issuing on an interconnect a corresponding initialization request indicating the target memory block; and in response to said initialization request, initializing said target memory block within a memory of the data processing system to an initialization value, wherein said target memory block is initialized without said cache memory holding a valid copy of said target memory block.

2. The method of claim 1, wherein said step of initializing comprises a memory controller of a system memory initializing the target memory block in system memory to the initialization value.

3. The method of claim 2, wherein said step of initializing further comprises another cache memory snooping said initialization request on said interconnect, and in response thereto, initializing its copy of the target memory block to said initialization value.

4. The method of claim 1, wherein said step of initializing further comprises another cache memory snooping said initialization request on said interconnect, and in response thereto, initializing its copy of the target memory block to said initialization value.

5. The method of claim 1, and further comprising:
another cache memory snooping said initialization request on said interconnect, and in response, updating its copy of the target memory block to a data-invalid coherency state.

6. The method of claim 1, and further comprising:
in response to a determination that said target memory block has a modified coherency state indicating said target memory block is not cached by another cache memory associated with another processor core, said cache memory initializing said memory block to said initialization value within a data array of said cache memory without issuing a corresponding initialization request on said interconnect.

7. The method of claim 1, said method further comprises:
in response to a determination that said target memory block has a coherency state indicating said cache memory is a highest point of coherency for said target memory block and that said target memory block may be cached by another cache memory associated with another processor core, said cache memory:
issuing an initialization request on said interconnect;
initializing said target memory block to said initialization value in its data array in response to receipt of a response to said initialization request indicating that no other cache memory associated with another processor core will retain a valid copy of said target memory block.

8. A processing unit for a data processing system including an interconnect, a system memory, and a memory controller coupled to the interconnect, said processing unit comprising:
a processor core; and
a cache memory coupled to the interconnect and said processing core, wherein said cache memory, responsive to receipt from said processor core of an initialization operation that indicates a target memory block to be initialized, determines a coherency state of said target memory block with respect to said cache memory and, in response to a determination that said target memory block has a data-invalid coherency state with respect to said cache memory, issues on the interconnect a corresponding initialization request requesting at least one of another cache memory and the memory controller to initialize its copy of said target memory block to an initialization value, such that said target memory block is initialized without said first cache memory holding a valid copy of said target memory block.

9. The processing unit of claim 8, wherein said cache memory, responsive to a determination that said target memory block has a modified coherency state indicating said target memory block is not cached by another cache memory associated with another processor core, initializes said memory block to said initialization value within a data array of said cache memory without issuing a corresponding initialization request on the interconnect.

10. The processing unit of claim 8, wherein said cache memory, responsive to a determination that said target memory block has a coherency state indicating said cache memory is a highest point of coherency for said target memory block and that said target memory block may be cached by another cache memory associated with another processor core, issues an initialization request on the interconnect and initializes said target memory block to said initialization value in its data array in response to receipt of a response to said initialization request indicating that no other cache memory associated with another processor core will retain a valid copy of said target memory block.

11. A data processing system, comprising:
a processing unit in accordance with claim 8;
said interconnect;
said system memory and said memory controller coupled to said interconnect; and
said another cache memory;
wherein, responsive to said initialization request, at least one a set including said another cache memory and said memory controller initializes said target memory block to said initialization value.

12. The data processing system of claim 11, wherein each of said second cache memory and said memory controller initializes its respective copy of the target memory block to said initialization value in response to snooping said initialization request on said interconnect.

13. The data processing system of claim 11, wherein said another cache memory, responsive to snooping said initialization request on said interconnect, updates its copy of the target memory block to a data-invalid coherency state.

14. A program product, comprising:
a computer usable storage medium;
program code encoded within said computer usable storage medium, wherein said program code, when processed, causes a computer system to perform steps of:
a processor core transmitting an initialization operation to an associated cache memory, said initialization operation indicating a target memory block to be initialized;
in response to receipt by the cache memory of the initialization operation, the cache memory determining a coherency state of said target memory block with respect to said cache memory;
in response to a determination that said target memory block has a data-invalid coherency state with respect to said cache memory, said cache memory issuing on an interconnect a corresponding initialization request indicating the target memory block; and
in response to said initialize request, initializing said target memory block within a memory of the data processing system to an initialization value, wherein said target memory block is initialized without said cache memory holding a valid copy of said target memory block.

15. The program product of claim 14, wherein said step of initializing comprises a memory controller of a system memory snooping said initialization request on said interconnect, and in response thereto, initializing the target memory block in system memory to the initialization value.

16. The program product of claim 15, wherein said step of initializing further comprises another cache memory snooping said initialization request on said interconnect, and in response thereto, initializing its copy of the target memory block to said initialization value.

17. The program product of claim 14, said steps further comprising:

in response to a determination that said target memory block has a modified coherency state indicating said target memory block is not cached by another cache memory associated with another processor core, said cache memory initializing said memory block to said initialization value within a data array of said cache memory without issuing a corresponding initialization request on said interconnect.

18. The program product of claim 14, said steps further comprising:

in response to a determination that said target memory block has a coherency state indicating said cache memory is a highest point of coherency for said target memory block and that said target memory block may be cached by another cache memory associated with another processor core, said cache memory:

issuing an initialization request on said interconnect;

initializing said target memory block to said initialization value in said data array in response to receipt of a response to said initialization request indicating that no other cache memory associated with another processor core will retain a valid copy of said target memory block.

* * * * *